United States Patent
Ju et al.

(10) Patent No.: US 10,526,451 B2
(45) Date of Patent: Jan. 7, 2020

(54) POLYAMIDE-IMIDE PRECURSOR, POLYAMIDE-IMIDE FILM, AND DISPLAY DEVICE COMPRISING SAME

(71) Applicant: KOLON INDUSTRIES, INC., Gwacheon-si, Gyeonggi-do (KR)

(72) Inventors: Chul Ha Ju, Yongin-si (KR); Hak Gee Jung, Yongin-si (KR); Hyo Jun Park, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 71 days.

(21) Appl. No.: 15/739,359

(22) PCT Filed: Jun. 27, 2016

(86) PCT No.: PCT/KR2016/006858
§ 371 (c)(1),
(2) Date: Dec. 22, 2017

(87) PCT Pub. No.: WO2016/209060
PCT Pub. Date: Dec. 29, 2016

(65) Prior Publication Data
US 2018/0186936 A1 Jul. 5, 2018

(30) Foreign Application Priority Data

Jun. 26, 2015 (KR) .................. 10-2015-0091076
Jun. 24, 2016 (KR) .................. 10-2016-0079424

(51) Int. Cl.
*C08G 73/14* (2006.01)
*C08J 5/18* (2006.01)

(52) U.S. Cl.
CPC ............... *C08G 73/14* (2013.01); *C08J 5/18* (2013.01); *C08J 2379/08* (2013.01)

(58) Field of Classification Search
None
See application file for complete search history.

(56) References Cited

U.S. PATENT DOCUMENTS

| 2012/0296050 A1 | 11/2012 | Cho et al. |
| 2013/0203937 A1 | 8/2013 | Cho et al. |
| 2018/0002487 A1 | 1/2018 | Yang et al. |

FOREIGN PATENT DOCUMENTS

| EP | 2540760 A1 | 1/2013 |
| EP | 3241860 A1 | 11/2017 |
| JP | 2008074991 A | 4/2008 |
| KR | 1997-0010832 A | 3/1997 |
| KR | 10-0958515 B1 | 5/2010 |
| KR | 10-2013-0035691 A | 4/2013 |
| KR | 10-2014-0016199 A | 2/2014 |
| KR | 10-2015-0065975 A | 6/2015 |
| KR | 10-1529496 B1 | 6/2015 |
| KR | 2016-0081845 A | 7/2016 |
| TW | 201311781 A1 | 3/2013 |
| TW | 201313785 A1 | 4/2013 |
| WO | 2014/003210 A | 1/2014 |

OTHER PUBLICATIONS

International Search Report for PCT/KR2016/006858, dated Oct. 12, 2016.

*Primary Examiner* — Ana L. Woodward
(74) *Attorney, Agent, or Firm* — Sughrue Mion, PLLC

(57) ABSTRACT

Disclosed is a polyamide-imide precursor having a molecular structure in which a first polymer, derived from polymerization of a dianhydride and a diamine, and a second polymer, derived from polymerization of a diamine and an aromatic dicarbonyl compound, are copolymerized, wherein the diamine includes 3 to 50 mol % of at least one of 9,9-bis(4-aminophenyl)fluorene (FDA) and 9,9-bis(4-amino-3-fluorophenyl)fluorene (F-FDA), based on the total molar amount of the diamine. Also, a copolymerized polyamide-imide in which the polyamide-imide precursor is imidized or a copolymerized polyamide-imide film formed by an imidization reaction of the polyamide-imide precursor and an image display device including the copolymerized polyamide-imide film are provided.

8 Claims, No Drawings

POLYAMIDE-IMIDE PRECURSOR, POLYAMIDE-IMIDE FILM, AND DISPLAY DEVICE COMPRISING SAME

CROSS REFERENCE TO RELATED APPLICATIONS

This application is a National Stage of International Application No. PCT/KR2016/006858 filed Jun. 27, 2016, claiming priority based on Korean Patent Application No. 10-2015-0091076 filed Jun. 26, 2015 and Korean Patent Application No. 10-2016-0079424, filed Jun. 24, 2016, the contents of all of which are incorporated herein by reference in their entirety.

TECHNICAL FIELD

The present invention relates to a polyamide-imide precursor, a polyamide-imide film manufactured by imidizing the polyamide-imide precursor, and a display device including the polyamide-imide film.

BACKGROUND ART

Generally, a polyimide film is formed from a polyimide resin. Such a polyimide resin is a highly heat-resistant resin prepared by subjecting an aromatic dianhydride and an aromatic diamine or an aromatic diisocyanate to solution polymerization, thus preparing a polyamic acid derivative, which is then subjected to ring-closing dehydration at a high temperature so as to be imidized. Since a polyimide resin is a very highly heat-resistant resin, which is insoluble and infusible, and is superior in terms of thermal oxidation resistance, heat resistance, radiation resistance, low-temperature characteristics, chemical resistance and the like, it has been utilized in a variety of fields including those of advanced heat-resistant materials, such as automotive materials, aircraft materials, spacecraft materials, etc., and electronic materials such as insulation coating materials, insulating layers, semiconductors, electrode-protecting films for TFT-LCDs, substrates for flexible printed wiring boards, optical communication materials, protective layers for solar cells, etc. Recently, such a resin is employed for display materials such as optical fibers or liquid crystal alignment layers, and is also used for transparent electrode films, either in a manner in which it is contained along with a conductive filler in the films or in a manner in which it is applied on the surface thereof.

However, a polyimide resin is brown- or yellow-colored, attributable to its high aromatic ring density, and thus has low transmittance in the visible light range. Additionally, it takes on a yellowish color, which decreases light transmittance and increases birefringence, making it difficult to utilize it for optical members. Also, when improving the optical properties thereof, a lower Tg (glass transition temperature) than that of conventional yellow-colored polyimide films may result, making it difficult to utilize it in fields requiring high temperatures of 300° C. or more.

With the goal of overcoming such problems, attempts have been made to purify monomers and solvents to high purity before polymerization, but to date the improvements in transmittance have not been significant. Furthermore, the use of a monomer having a rigid structure in order to realize thermal stability may remarkably deteriorate transmittance or may increase yellowness.

With regard to conventional techniques pertaining to polyimide, U.S. Pat. No. 5,053,480 discloses the use of an aliphatic cyclic dianhydride component in lieu of aromatic dianhydride. Although the prepared solution or film is improved in transparency and color compared to when using the purification method, the increase in transmittance is limited, and thus high transmittance cannot be realized, and moreover, deteriorated thermal and mechanical properties may result.

Furthermore, U.S. Pat. Nos. 4,595,548, 4,603,061, 4,645,824, 4,895,972, 5,218,083, 5,093,453, 5,218,077, 5,367,046, 5,338,826, 5,986,036 and 6,232,428 and Korean Patent Application Publication No. 2003-0009437 disclose a novel polyimide having improved transmittance and color transparency in the range within which thermal properties are not significantly deteriorated, using aromatic dianhydride and aromatic diamine monomers, having a linker such as —O—, —$SO_2$—, —$CH_2$—, etc., a bent structure due to the connection to an m-position rather than a p-position, or a substituent such as —$CF_3$, etc., but the above polyimide is unsuitable for use in display devices, such as OLEDs, TFT-LCDs, flexible displays, and the like, in terms of mechanical properties, heat resistance, and birefringence.

Meanwhile, these days thorough research into a variety of plastic materials is ongoing as alterative materials to glass substrates in order to realize flexible displays. In particular, polyimide film is receiving great attention because it enables the formation of a curved surface and is also able to achieve properties of thinness, light weight and low brittleness. In order to apply the polyimide material to display processing, there is a need to ensure high thermal stability and a low coefficient of thermal expansion for dimensional stability so as to be capable of withstanding the processing conditions, and also to maintain properties of colorlessness and transparency.

DISCLOSURE

Technical Problem

Accordingly, the present invention is intended to provide a polyamide-imide precursor for forming a film having improved thermal stability and a desired coefficient of thermal expansion while being colorless and transparent. Also, the present invention is intended to provide a polyamide-imide film manufactured by imidizing the polyamide-imide precursor and an image display device including the same.

Technical Solution

A preferred first embodiment of the present invention provides a polyamide-imide precursor, having a molecular structure in which a first polymer, derived from polymerization of a dianhydride and a diamine, and a second polymer, derived from polymerization of a diamine and an aromatic dicarbonyl compound, are copolymerized, the diamine including 3 to 50 mol % of at least one of 9,9-bis(4-aminophenyl)fluorene (FDA) and 9,9-bis(4-amino-3-fluorophenyl)fluorene (F-FDA), based on the total molar amount of the diamine.

In addition, a preferred second embodiment of the present invention provides a copolymerized polyamide-imide in which the polyamide-imide precursor of the first embodiment is imidized, and a preferred third embodiment thereof provides a copolymerized polyamide-imide film formed by an imidization reaction of the polyamide-imide precursor of the first embodiment.

In addition, a preferred fourth embodiment of the present invention provides an image display device, including the polyamide-imide film of the third embodiment.

Advantageous Effects

According to the present invention, when a polyamide-imide precursor is imidized, a polyamide-imide or polyamide-imide film, which is colorless and transparent and exhibits superior thermal stability and a desired coefficient of thermal expansion, can be manufactured.

In particular, the polyamide-imide film of the present invention, having desired optical properties and thermal properties, can be usefully applied to a variety of fields, such as those of semiconductor insulating layers, TFT-LCD insulating layers, passivation layers, liquid crystal alignment layers, optical communication materials, protective layers for solar cells, flexible display substrates, and the like.

BEST MODE

The present invention addresses a polyamide-imide precursor, in which mechanical properties, which may be insufficient when only an imide structure is contained, may be ensured through a polymer having an amide bonding structure, whereby thermal stability, mechanical properties, and optical properties may be ultimately improved in a balanced manner.

More specifically, the present invention pertains to a polyamide-imide precursor having a molecular structure in which a first polymer, derived from polymerization of a dianhydride and a diamine, and a second polymer, derived from polymerization of a diamine and an aromatic dicarbonyl compound, are copolymerized. Here, the diamine includes 3 to 50 mol % of at least one of 9,9-bis(4-aminophenyl)fluorene (FDA) and 9,9-bis(4-amino-3-fluorophenyl)fluorene (F-FDA), based on the total molar amount of the diamine. Thereby, the polyamide-imide precursor of the present invention is imidized and may thus be provided in the form of a polyamide-imide or a polyamide-imide film, which is colorless and transparent and exhibits superior thermal stability and a desired coefficient of thermal expansion.

In the present invention, the amount of 9,9-bis(4-aminophenyl)fluorene (FDA) and/or 9,9-bis(4-amino-3-fluorophenyl)fluorene (F-FDA), included in the diamine, may have an influence on properties such as thermal stability and coefficient of thermal expansion of a polyamide-imide or a polyamide-imide film obtained by imidizing the polyamide-imide precursor. When the amount of 9,9-bis(4-aminophenyl)fluorene (FDA) and/or 9,9-bis(4-amino-3-fluorophenyl)fluorene (F-FDA), included in the diamine, is increased, a relatively short molecular chain is formed, whereby the motion of the polymer chain is limited, thus increasing the glass transition temperature, resulting in improved thermal stability. On the other hand, when the amount thereof is decreased, the molecular chain may be formed to be relatively long and the molecular weight may be increased, thus improving optical properties such as optical transmittance or yellow index and attaining a low coefficient of thermal expansion.

Accordingly, the amount of 9,9-bis(4-aminophenyl)fluorene (FDA) and/or 9,9-bis(4-amino-3-fluorophenyl)fluorene (F-FDA) may be appropriately controlled within a range of 3 to 50 mol %. If the amount thereof exceeds 50 mol % based on the total molar amount of the diamine, the coefficient of thermal expansion is excessively increased, and thus dimensional stability problems such as twisting may occur during the manufacture of displays, and due to the low molecular weight and a difficulty in ensuring polymerization stability, the film to be manufactured may have low flexibility or may become brittle. On the other hand, if the amount thereof is less than 3 mol %, high thermal stability cannot be expected.

Meanwhile, in the present invention, the dianhydride may be at least one selected from the group consisting of 2,2-bis(3,4-dicarboxyphenyl)hexafluoropropane dianhydride (6FDA), biphenyl tetracarboxylic dianhydride (BPDA), 4-(2,5-dioxotetrahydrofuran-3-yl)-1,2,3,4-tetrahydronaphthalene-1,2-dicarboxylic anhydride (TDA), pyromellitic dianhydride (PMDA), benzophenone tetracarboxylic dianhydride (BTDA), oxydiphthalic dianhydride (ODPA), bis-carboxyphenyl dimethyl silane dianhydride (SiDA), bis dicarboxyphenoxy diphenyl sulfide dianhydride (BDSDA), sulfonyl diphthalic anhydride ($SO_2$DPA) and isopropylidene diphenoxy bis(phthalic anhydride) (6HBDA).

Here, the dianhydride preferably includes at least one of 2,2-bis(3,4-dicarboxyphenyl)hexafluoropropane dianhydride (6FDA) and biphenyl tetracarboxylic dianhydride (BPDA). When these two components are mixed at a molar ratio of 4:6 to 2:8 (6FDA:BPDA), superior optical properties and heat resistance and a low coefficient of thermal expansion (CTE) may be simultaneously obtained. If the amount of 6FDA is increased so as to fall out of the above range, optical properties may be improved but the coefficient of thermal expansion (CTE) and heat resistance may deteriorate, and if the amount of BPDA is increased, polymerization stability may decrease and optical properties may deteriorate.

In the present invention, the diamine may include, based on the total molar amount of the diamine, 50 to 97 mol % of at least one selected from the group consisting of bis aminophenoxy benzene (133APB), bis aminophenoxy benzene (134APB), bis aminophenoxy phenyl hexafluoropropane (4BDAF), bis aminophenyl hexafluoropropane (33-6F), bis aminophenyl hexafluoropropane (44-6F), bis aminophenyl sulfone (ODDS), bis aminophenyl sulfone (3DDS), bis trifluoromethyl benzidine (TFDB), cyclohexane diamine (13CHD), cyclohexane diamine (14CHD), bis aminophenoxy phenyl propane (6HMDA), bis aminohydroxy phenyl hexafluoropropane (DBOH) and bis aminophenoxy diphenyl sulfone (DBSDA).

Although not necessarily limited thereto, in the present invention, it is preferred that bis trifluoromethyl benzidine (TFDB) among the above diamine components be used together with (9,9-bis(4-aminophenyl)fluorene (FDA) and/or 9,9-bis(4-amino-3-fluorophenyl)fluorene (F-FDA). Bis trifluoromethyl benzidine (TFDB) is configured to contain a —$CF_3$ substituent to thereby limit electron transfer, and is also composed of an aromatic and may thus exhibit high optical properties and high heat resistance compared to other diamines. Hence, the use thereof along with (9,9-bis(4-aminophenyl)fluorene (FDA) and/or 9,9-bis(4-amino-3-fluorophenyl)fluorene (F-FDA) may manifest synergistic effects.

In the present invention, the aromatic dicarbonyl compound may be at least one selected from the group consisting of terephthaloyl chloride (TPC), isophthaloyl dichloride (IPC) and 4,4'-biphenyldicarbonyl chloride (BZC). Among these, the use of terephthaloyl chloride (TPC) having a structurally rigid aromatic structure is preferable in order to realize high mechanical properties, a desired CTE and improved optical properties.

In the present invention, the molar ratio of the first polymer and the second polymer may range from 30:70 to 45:55, and preferably from 35:65 to 40:60. In the present invention, the first polymer is a polymer having a bonding structure that enables imidization, and the second polymer is a polymer having an amide bonding structure. If the proportion of the first polymer is excessively high so as to fall outside of the above range, the extent of improvement in thermal stability is insignificant, whereas optical properties are remarkably decreased, CTE may increase and mechanical properties may deteriorate. On the other hand, if the proportion of the second polymer is excessively high, polymerization stability may deteriorate and thus the film becomes brittle and thermal properties may deteriorate, and particularly, large birefringence may result due to an increase in the content of rigid structures, and thus the use thereof as an optical member may become difficult.

The polyamide-imide precursor of the present invention has a weight average molecular weight ranging from 200,000 to 300,000, and particularly from 230,000 to 280,000, measured by GPC (Gel Permeation Chromatography) in the solid content range of about 10 to 20 wt %. As such, the viscosity preferably falls in the range of 230 to 270 poise.

In addition, the present invention addresses a polyamide-imide obtained by subjecting the polyamide-imide precursor to ring-closing dehydration, namely imidization, or a polyamide-imide film formed through imidization thereof. In the present invention, the manufacture of the polyamide-imide or the polyamide-imide film using the polyamide-imide precursor may include the following imidization process.

Specifically, the diamine and each of the dianhydride and the aromatic dicarbonyl compound, satisfying the aforementioned conditions of the present invention, are copolymerized at an equivalent ratio of 1:1 to give a polyamide-imide precursor solution. Here, the polymerization conditions are not particularly limited, but the reaction may be carried out at −10 to 80° C. for 2 to 48 hr in an inert atmosphere such as nitrogen or argon.

In the present invention, a solvent may be used for solution polymerization of individual monomers, and the solvent is not particularly limited, so long as it is a known reaction solvent. Preferably used is at least one polar solvent selected from among m-cresol, N-methyl-2-pyrrolidone (NMP), dimethylformamide (DMF), dimethylacetamide (DMAc), dimethylsulfoxide (DMSO), acetone, ethyl acetate, diethylformamide (DEF), diethyl acetamide (DEA), propylene glycol monomethyl ether (PGME), and propylene glycol monomethyl ether acetate (PGMEA). In addition thereto, a low-boiling-point solution such as tetrahydrofuran (THF) or chloroform or a low-absorbency solvent such as γ-butyrolactone may be utilized. These solvents may be used alone or in combinations of two or more depending on the purpose of use.

The amount of the solvent is not particularly limited, but is preferably 50 to 95 wt %, and more preferably 70 to 90 wt %, based on the total amount of the polyamide-imide precursor solution, in order to realize appropriate molecular weight and viscosity of the polyamide-imide precursor solution.

Although inclusion thereof does not particularly limit the present invention, upon the formation of a film using the polyamide-imide precursor solution, the polyamide-imide precursor solution may be added with a filler in order to improve various properties such as sliding property, thermal conductivity, electrical conductivity, and corona resistance of the film. The filler is not particularly limited, and specific examples thereof preferably include silica, titanium oxide, lamellar silica, carbon nanotubes, alumina, silicon nitride, boron nitride, calcium hydrogen phosphate, calcium phosphate, mica, and the like.

The particle size of the filler may vary depending on the properties of the film to be modified and the kind of filler to be added, and is not particularly limited, but has an average particle size of 0.001~50 μm, and preferably 0.005~25 μm, and more preferably 0.01~10 μm. In this case, it is easy to exhibit modification effects of the polyimide film, and good surface properties, conductivity and mechanical properties of the polyimide film may be obtained.

The amount of the filler may vary depending on the properties of the film to be modified and the particle size of the filler, and is not particularly limited. The amount of the filler is preferably 0.001~20 parts by weight, and more preferably 0.01~10 parts by weight based on 100 parts by weight of the polyamic acid solution.

The process of adding the filler is not particularly limited, and includes, for example, adding the filler to the polyamic acid solution before or after polymerization, kneading the filler using a 3-roll mill or the like after completion of polyamic acid polymerization, or mixing a dispersion solution containing the filler with the polyamic acid solution.

Subsequently, the obtained polyamide-imide precursor solution may be imidized using any process appropriately selected from among known imidization processes. For example, the polyamide-imide precursor solution may be subjected to thermal imidization for gradual heating of the polyamide-imide precursor solution in the temperature range of 40 to 500° C. for 1 to 8 hr, chemical imidization for the addition of the polyamide-imide precursor solution with a dehydrating agent including an acid anhydride such as acetic anhydride, etc. and an imidization catalyst including a tertiary amine such as isoquinoline, β-picoline, pyridine, etc., or a combination of thermal imidization and chemical imidization.

Here, when the thermal imidization is used alone, the yellow index of the film may increase due to the high imidization temperature, making it difficult to exhibit properties of colorlessness and transparency. Hence, in the present invention, about 60~70% of the polyamic acid is preferably imidized in the presence of an imidization catalyst, followed by a combination of thermal imidization and chemical imidization so that polyimide is produced through thermal imidization, but the present invention is not necessarily limited thereto.

More specifically, the polyamide-imide precursor solution may be added with a dehydrating agent and an imidization catalyst, cast on a support such as a glass plate, a piece of aluminum foil, a circulating stainless belt or a stainless drum, heated at 100 to 250° C. to activate the dehydrating agent and the imidization catalyst, partially cured and dried, and then heated at 100 to 500° C. for 1 to 30 min, resulting in a polyamide-imide film.

Also in the present invention, a polyamide-imide film may be manufactured as follows. Specifically, the obtained polyamide-imide precursor solution is imidized, after which the imidized solution is added to the second solvent, precipitated, filtered, and dried to give a polyamide-imide resin solid, which is then dissolved in the first solvent to prepare a polyamide-imide solution, followed by a film-forming process, resulting in a desired film. In the manufacturing method as above, precipitation, filtration and drying processes are stepwisely performed, thus removing the unreacted monomer or preventing polymerization into a low molecular weight, thereby realizing a desired yellow index of the film.

The first solvent may be the same as the solvent used upon polymerization of the polyamic acid solution, and the second solvent may be a solvent having lower polarity than the first solvent in order to obtain the polyamide-imide resin solid. Specifically, the second solvent may include at least one selected from among water, alcohols, ethers, and ketones. Here, the amount of the second solvent is not particularly limited, but is preferably 5 to 20 times the weight of the polyamic acid solution.

The conditions for drying the filtered polyamide-imide resin solid may include a temperature of 50 to 120° C. and a time period of 3 to 24 hr, taking into consideration the boiling point of the second solvent. In the subsequent film-forming process, the polyamide-imide solution in which the polyamide-imide resin solid is dissolved is cast on a support and heated for 1 min to 8 hr while gradually increasing the temperature thereof in the temperature range of 40 to 400° C., thereby obtaining a polyamide-imide film.

In the present invention, the polyamide-imide film thus obtained is thermally treated once more under tension to thereby remove thermal hysteresis and residual stress from the film, thereby reducing the hysteresis of the coefficient of thermal expansion and ensuring stable thermal properties of the film. Unless final thermal treatment is performed, residual stress that acts to shrink the film reduces thermal expansion, whereby the coefficient of thermal expansion may become very different, that is, may be excessively decreased, compared to conventional films. Here, additional thermal treatment is preferably performed at 300 to 500° C. for 1 min to 3 hr. After completion of the thermal treatment, the film has a residual volatile content of 5% or less, and preferably 3% or less.

The thickness of the obtained polyamide-imide film is not particularly limited, but preferably falls in the range from 5 to 250 μm, and more preferably from 10 to 100 μm.

The polyamide-imide film according to the present invention may have a coefficient of thermal expansion (CTE) of 30 ppm/° C. or less measured at 50 to 300° C. and a glass transition temperature (Tg) of 350 to 380° C. In this way, the polyamide-imide film according to the present invention having superior thermal stability and a low coefficient of thermal expansion may be prevented from warping or deformation even under harsh processing temperatures or drastic changes in temperature during the manufacture of displays, thereby exhibiting a high yield.

Also the polyamide-imide film according to the present invention may have a transmittance of 87% or more measured at 550 nm for a film thickness of 10 to 100 μm, and a yellow index of 7 or less in accordance with ASTM E313, and may thus exhibit superior optical properties.

Thereby, the polyamide-imide film according to the present invention may be easily applied to fields requiring transparency, in which the use of existing polyimide films has been limited owing to the yellow color thereof, including image display devices, such as protective layers or diffusion plates and coating layers in TFT-LCDs, for example, interlayers, gate insulators and liquid crystal alignment layers in TFT-LCDs. Moreover, the film of the invention may be utilized as a hard coating film and a flexible display substrate in lieu of glass in existing displays.

MODE FOR INVENTION

Examples

A better understanding of the present invention may be obtained through the following examples, which are merely set forth to illustrate, but are not to be construed as limiting the scope of the present invention.

Example 1

After a 1 L reactor equipped with a stirrer, a nitrogen injector, a dropping funnel, a temperature controller and a condenser was purged with nitrogen, 762 g of N,N-dimethylacetamide (DMAc) was placed in the reactor and the temperature of the reactor was adjusted to 25° C. Thereafter, 55.91 g (0.175 mol) of TFDB and 1.88 g (0.005 mol) of FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 250 poise. Here, the viscosity was measured two times using a Brookfield viscometer (RVDV-II+P) while stirring at 50 rpm using a No. 6 or No. 7 spindle at 25° C. and the measurements were averaged.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 93.5 g of a copolymerized polyamide-imide in a solid powder phase. Subsequently, 90 g of the copolymerized polyamide-imide in a solid powder phase was dissolved in 725 g of N,N-dimethylacetamide (DMAc) to give an 11 wt % solution. The solution thus obtained was applied onto a stainless steel plate, cast, dried with hot air at 150° C. for 1 hr, at 200° C. for 1 hr and at 300° C. for 30 min, gradually cooled, and then stripped from the stainless steel plate, thus obtaining a polyamide-imide film having a thickness of 80 μm (Anritsu Electronic Micrometer, deviation: ±0.5% or less). The film thus formed was finally thermally treated at 300° C. for 10 min.

Example 2

After a 1 L reactor equipped with a stirrer, a nitrogen injector, a dropping funnel, a temperature controller and a condenser was purged with nitrogen, 768 g of N,N-dimethylacetamide (DMAc) was placed in the reactor, and the temperature of the reactor was adjusted to 25° C. Thereafter, 46.11 g (0.144 mol) of TFDB and 12.54 g (0.036 mol) of FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 248 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 94.3 g of a copolymerized polyamide-imide in a solid powder phase. Subsequent procedures were performed in the same manner as in Example 1, thereby manufacturing a polyamide-imide film having a thickness of 78 μm.

Example 3

After a 1 L reactor equipped with a stirrer, a nitrogen injector, a dropping funnel, a temperature controller and a condenser was purged with nitrogen, 780 g of N,N-dimethylacetamide (DMAc) was placed in the reactor and the temperature of the reactor was adjusted to 25° C. Thereafter, 28.82 g (0.09 mol) of TFDB and 31.36 g (0.09 mol) of FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 240 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 95.7 g of a copolymerized polyamide-imide in a solid powder phase. Subsequent procedures were performed in the same manner as in Example 1, thereby manufacturing a polyamide-imide film having a thickness of 77 μm.

Example 4

After a 1 L reactor equipped with a stirrer, a nitrogen injector, a dropping funnel, a temperature controller and a condenser was purged with nitrogen, 764 g of N,N-dimethylacetamide (DMAc) was placed in the reactor, and the temperature of the reactor was adjusted to 25° C. Thereafter, 55.91 g (0.175 mol) of TFDB and 2.08 g (0.005 mol) of F-FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 242 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 93.7 g of a copolymerized polyamide-imide in a solid powder phase. Subsequent procedures were performed in the same manner as in Example 1, thereby manufacturing a polyamide-imide film having a thickness of 81 μm.

Example 5

After a 1 L reactor equipped with a stirrer, a nitrogen injector, a dropping funnel, a temperature controller and a condenser was purged with nitrogen, 778 g of N,N-dimethylacetamide (DMAc) was placed in the reactor, and the temperature of the reactor was adjusted to 25° C. Thereafter, 46.11 g (0.144 mol) of TFDB and 13.84 g (0.036 mol) of F-FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 252 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 94.5 g of a copolymerized polyamide-imide in a solid powder phase. Subsequent procedures were performed in the same manner as in Example 1, thereby manufacturing a polyamide-imide film having a thickness of 80 μm.

Example 6

After a 1 L reactor equipped with a stirrer, a nitrogen injector, a dropping funnel, a temperature controller and a condenser was purged with nitrogen, 803 g of N,N-dimethylacetamide (DMAc) was placed in the reactor, and the temperature of the reactor was adjusted to 25° C. Thereafter, 28.82 g (0.09 mol) of TFDB and 34.60 g (0.09 mol) of F-FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 238 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 96.6 g of a copolymerized polyamide-imide in a solid powder phase. Subsequent procedures were performed in the same manner as in Example 1, thereby manufacturing a polyamide-imide film having a thickness of 78 μm.

Example 7

After a 1 L reactor equipped with a stirrer, a nitrogen injector, a dropping funnel, a temperature controller and a condenser was purged with nitrogen, 792 g of N,N-dimethylacetamide (DMAc) was placed in the reactor and the temperature of the reactor was adjusted to 25° C. Thereafter, 28.82 g (0.09 mol) of TFDB, 15.68 g (0.045 mol) of FDA and 17.30 g (0.045 mol) of F-FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 238 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 94.8 g of a copolymerized polyamide-imide in a solid powder phase. Subsequent procedures were performed in the same manner as in Example 1, thereby manufacturing a polyamide-imide film having a thickness of 78 μm.

Example 8

A polyamide-imide precursor solution having a solid content of 12 wt % and a viscosity of 242 poise was obtained in the same manner as in Example 2, with the exception that 22.29 g (0.109 mol) of IPC (made by TCI) was added in lieu of 22.29 g (0.109 mol) of TPC. The polyamide-imide precursor solution thus obtained was imidized in the same manner as in Example 2, thus yielding 94.2 g of a copolymerized polyamide-imide in a solid powder phase, which was then formed into a polyamide-imide film having a thickness of 79 μm.

Example 9

A polyamide-imide precursor solution having a solid content of 12 wt % and a viscosity of 240 poise was obtained in the same manner as in Example 2, with the exception that BPDA, 6FDA and TPC were added in respective amounts of 16.42 g (0.056 mol), 11.20 g (0.025 mol) and 20.10 g (0.099 mol). The polyamide-imide precursor solution thus obtained was imidized in the same manner as in Example 2, thus yielding 98.3 g of a copolymerized polyamide-imide in a solid powder phase, which was then formed into a polyamide-imide film having a thickness of 77 μm.

Example 10

A polyamide-imide precursor solution having a solid content of 12 wt % and a viscosity of 245 poise was obtained in the same manner as in Example 2, with the exception that BPDA, 6FDA and TPC were added in respective amounts of 13.24 g (0.045 mol), 7.80 g (0.018 mol) and 23.75 g (0.117 mol). The polyamide-imide precursor solution thus obtained was imidized in the same manner as in Example 2, thus yielding 95.4 g of a copolymerized polyamide-imide in a solid powder phase, which was then formed into a polyamide-imide film having a thickness of 78 μm.

Example 11

A polyamide-imide precursor solution having a solid content of 12 wt % and a viscosity of 247 poise was obtained in the same manner as in Example 2, with the exception that BPDA, 6FDA and TPC were added in respective amounts of 11.12 g (0.038 mol), 7.20 g (0.016 mol) and 25.58 g (0.126 mol). The polyamide-imide precursor solution thus obtained was imidized in the same manner as in Example 2, thus yielding 93.7 g of a copolymerized polyamide-imide in a solid powder phase, which was then formed into a polyamide-imide film having a thickness of 78 μm.

Example 12

A polyamide-imide precursor solution having a solid content of 12 wt % and a viscosity of 235 poise was obtained in the same manner as in Example 2, with the exception that 35.76 g (0.144 mol) of 3DDS (TCI) was added in lieu of 46.11 g (0.144 mol) of TFDB. The polyamide-imide precursor solution thus obtained was imidized in the same manner as in Example 2, thus yielding 83.7 g of a copolymerized polyamide-imide in a solid powder phase, which was then formed into a polyamide-imide film having a thickness of 78 μm.

Example 13

A polyamide-imide precursor solution having a solid content of 12 wt % and a viscosity of 242 poise was obtained in the same manner as in Example 5, with the exception that 35.76 g (0.144 mol) of 3DDS (TCI) was added in lieu of 46.11 g (0.144 mol) of TFDB. The polyamide-imide precursor solution thus obtained was imidized in the same manner as in Example 5, thus yielding 87.8 g of a copolymerized polyamide-imide in a solid powder phase, which was then formed into a polyamide-imide film having a thickness of 79 μm.

Example 14

A polyamide-imide precursor solution having a solid content of 12 wt % and a viscosity of 248 poise was obtained in the same manner as in Example 2, with the exception that 6FDA alone was added in an amount of 31.19 g (0.070 mol), without the addition of BPDA. The polyamide-imide precursor solution thus obtained was imidized in the same manner as in Example 2, thus yielding 99.3 g of a copolymerized polyamide-imide in a solid powder phase, which was then formed into a polyamide-imide film having a thickness of 78 μm.

Comparative Example 1

After a 1 L reactor equipped with a stirrer, a nitrogen injector, a dropping funnel, a temperature controller and a condenser was purged with nitrogen, 761 g of N,N-dimethylacetamide (DMAc) was placed in the reactor and the temperature of the reactor was adjusted to 25° C. Thereafter, 57.64 g (0.18 mol) of TFDB was added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 252 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 92.1 g of a copolymerized polyamide-imide in a solid powder phase. Subsequent procedures were performed in the same manner as in Example 1, thereby manufacturing a polyamide-imide film having a thickness of 80 μm.

Comparative Example 2

After a 1 L reactor equipped with a stirrer, a nitrogen injector, a dropping funnel, a temperature controller and a condenser was purged with nitrogen, 758 g of N,N-dimethylacetamide (DMAc) was placed in the reactor and the temperature of the reactor was adjusted to 25° C. Thereafter, 54.06 g (0.178 mol) of TFDB and 0.63 g (0.002 mol) of FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 248 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 92.7 g of a copolymerized polyamide-imide in a solid powder phase. Subsequent procedures were performed in the same manner as in Example 1, thereby manufacturing a polyamide-imide film having a thickness of 80 μm.

Comparative Example 3

After a 1 L reactor equipped with a stirrer, a nitrogen injector, a dropping funnel, a temperature controller and a condenser was purged with nitrogen, 759 g of N,N-dimethylacetamide (DMAc) was placed in the reactor and the temperature of the reactor was adjusted to 25° C. Thereafter, 54.06 g (0.178 mol) of TFDB and 0.69 g (0.002 mol) of F-FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 253 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 93.2 g of a copolymerized polyamide-imide in a solid powder phase. Subsequent procedures were performed in the same manner as in Example 1, thereby manufacturing a polyamide-imide film having a thickness of 78 μm.

Comparative Example 4

After a 1 L reactor equipped with a stirrer, a nitrogen injector, a dropping funnel, a temperature controller and a condenser was purged with nitrogen, 782 g of N,N-dimethylacetamide (DMAc) was placed in the reactor, and the temperature of the reactor was adjusted to 25° C. Thereafter, 25.94 g (0.081 mol) of TFDB and 34.50 g (0.099 mol) of FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 248 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 94.5 g of a copolymerized polyamide-imide in a solid powder phase. Subsequent procedures were performed in the same manner as in Example 1, thereby manufacturing a polyamide-imide film having a thickness of 80 μm.

Comparative Example 5

After a 1 L reactor equipped with a stirrer, a nitrogen injector, a dropping funnel, a temperature controller and a condenser was purged with nitrogen, 808 g of N,N-dimethylacetamide (DMAc) was placed in the reactor and the temperature of the reactor was adjusted to 25° C. Thereafter, 25.94 g (0.081 mol) of TFDB and 38.06 g (0.099 mol) of F-FDA were added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 253 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 97.6 g of a copolymerized polyamide-imide in a solid powder phase. Subsequent procedures were performed in the same manner as in Example 1, thereby manufacturing a polyamide-imide film having a thickness of 78 μm.

Comparative Example 6

After a 1 L reactor equipped with a stirrer, a nitrogen injector, a dropping funnel, a temperature controller and a condenser was purged with nitrogen, 798 g of N,N-dimethylacetamide (DMAc) was placed in the reactor and the temperature of the reactor was adjusted to 25° C. Thereafter, 62.72 g (0.18 mol) of FDA was added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 209 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 92.0 g of a copolymerized polyamide-imide in a solid powder phase. Thereafter, an attempt to manufacture a polyamide-imide film was made in the same manner as in Example 1, but the film became brittle upon drying owing to the low polymerization stability and molecular weight thereof, making it impossible to obtain a film.

Comparative Example 7

After a 1 L reactor equipped with a stirrer, a nitrogen injector, a dropping funnel, a temperature controller and a condenser was purged with nitrogen, 846 g of N,N-dimethylacetamide (DMAc) was placed in the reactor and the temperature of the reactor was adjusted to 25° C. Thereafter, 69.20 g (0.18 mol) of F-FDA was added thereto and dissolved, and the resulting solution was maintained at 25° C. Also, 14.30 g (0.049 mol) of BPDA and 9.60 g (0.022 mol) of 6FDA were added thereto, stirred for a predetermined period of time, dissolved and allowed to react. Thereafter, the resulting solution was maintained at 15° C., and 22.29 g (0.109 mol) of TPC was then added thereto, followed by reaction at 25° C. for 12 hr, thus obtaining a polyamide-imide precursor solution having a solid content of 12 wt % and a viscosity of 198 poise.

The polyamide-imide precursor solution thus obtained was added with 17.09 g of pyridine and 21.86 g of acetic anhydride, stirred for 30 min, further stirred at 80° C. for 1 hr, cooled to room temperature, and precipitated using 20 L of methanol, after which the precipitated solid was filtered, pulverized and dried at 100° C. in a vacuum for 6 hr to give 93.8 g of a copolymerized polyamide-imide in a solid powder phase. Thereafter, an attempt to manufacture a polyamide-imide film was made in the same manner as in Example 1, but the film became brittle upon drying owing to the low polymerization stability and molecular weight thereof, making it impossible to obtain a film.

<Measurement>

The properties of the polyamide-imide films of Examples and Comparative Examples were evaluated through the following methods. The results are shown in Table 1 below.

(1) Measurement of Transmittance: Transmittance was measured three times at 550 nm using a UV spectrophotometer (Konica Minolta CM-3700d) and the measurements were averaged. The results are shown in Table 1 below.

(2) Measurement of Yellow Index (Y.I.): A yellow index was measured in accordance with ASTM E313 using a UV spectrophotometer (Konica Minolta CM-3700d).

(3) Measurement of Glass Transition Temperature (Tg): Using a DMA (TA instrument Inc. DMA Q800), heating at a rate of 5° C./min in the range of room temperature ~400° C. was performed and the peak of tan δ was taken as Tg.

(4) Measurement of Coefficient of Thermal Expansion (CTE): CTE was measured two times in the range of 50~300° C. using a TMA (TA Instrument, Q400) through a TMA method. Here, the sample was 4 mm×24 mm in size, the load was 0.02 N, and the heating rate was 10° C./min. Since residual stress may be left behind in the film after the film formation, thermal treatment was carried out to thus completely remove residual stress in the first run, after which the value measured after the second run was taken as an actual measurement value.

TABLE 1

| NO. | Composition | Molar ratio (First polymer:Second polymer) | Transmittance at 550 nm (%) | Y.I. | Tg (° C.) | CTE (ppm/° C.) |
|---|---|---|---|---|---|---|
| Ex.1 | BPDA/6FDA/TPC/TFDB/FDA | 27/12/61/97/3(39:61) | 88.3 | 4.4 | 352 | 15 |
| Ex.2 | BPDA/6FDA/TPC/TFDB/FDA | 27/12/61/80/20(39:61) | 87.8 | 5.5 | 369 | 22 |
| Ex.3 | BPDA/6FDA/TPC/TFDB/FDA | 27/12/61/50/50(39:61) | 87.3 | 6.5 | 380 | 28 |
| Ex.4 | BPDA/6FDA/TPC/TFDB/F-FDA | 27/12/61/97/3(39:61) | 88.4 | 4.5 | 351 | 16 |
| Ex.5 | BPDA/6FDA/TPC/TFDB/F-FDA | 27/12/61/80/20(39:61) | 88 | 5.2 | 363 | 23 |
| Ex.6 | BPDA/6FDA/TPC/TFDB/F-FDA | 27/12/61/50/50(39:61) | 87.5 | 6.3 | 372 | 29 |
| Ex.7 | BPDA/6FDA/TPC/TFDB/FDA/F-FDA | 27/12/61/50/25/25(39:61) | 87.6 | 5.5 | 370 | 24 |
| Ex.8 | BPDA/6FDA/TPC/TFDB/FDA | 27/12/61/80/20(39:61) | 88.2 | 4.3 | 350 | 20 |
| Ex.9 | BPDA/6FDA/TPC/TFDB/FDA | 31/14/55/80/20(45:55) | 88.0 | 4.8 | 360 | 25 |
| Ex.10 | BPDA/6FDA/TPC/TFDB/FDA | 25/10/65/80/20(35:65) | 87.9 | 5.2 | 358 | 20 |
| Ex.11 | BPDA/6FDA/TPC/TFDB/FDA | 21/9/70/80/20(30:70) | 88.1 | 5.0 | 354 | 22 |
| Ex.12 | BPDA/6FDA/TPC/3DDS/FDA | 27/12/61/80/20(39:61) | 87.4 | 6.3 | 352 | 28 |
| Ex.13 | BPDA/6FDA/TPC/3DDS/F-FDA | 27/12/61/80/20(39:61) | 87.5 | 6.1 | 354 | 29 |
| Ex.14 | 6FDA/TPC/TFDB/FDA | 39/61/80/20(39:61) | 88.1 | 5.1 | 360 | 29 |
| Comp.Ex.1 | BPDA/6FDA/TPC/TFDB | 27/12/61/100(39:61) | 88.2 | 4.3 | 340 | 13 |
| Comp.Ex.2 | BPDA/6FDA/TPC/TFDB/FDA | 27/12/61/99/1(39:61) | 88.2 | 4.3 | 341 | 14 |
| Comp.Ex.3 | BPDA/6FDA/TPC/TFDB/F-FDA | 27/12/61/99/1(39:61) | 88.2 | 4.3 | 340 | 14 |
| Comp.Ex.4 | BPDA/6FDA/TPC/TFDB/FDA | 27/12/61/45/55(39:61) | 86.8 | 7.5 | 382 | 34 |
| Comp.Ex.5 | BPDA/6FDA/TPC/TFDB/F-FDA | 27/12/61/45/55(39:61) | 86.9 | 7.3 | 374 | 37 |
| Comp.Ex.6 | BPDA/6FDA/TPC/FDA | 27/12/61/100(39:61) | Film not-formed | — | — | — |
| Comp.Ex.7 | BPDA/6FDA/TPC/F-FDA | 27/12/61/100(39:61) | Film not-formed | — | — | — |

As is apparent from Examples 1 to 3 or Examples 4 to 6 of Table 1, when the amount of FDA or F-FDA among the diamine components was increased, optical properties were slightly deteriorated and the CTE was increased, but a relatively short molecular chain was formed, whereby the motion of the polymer chain was limited, thus increasing the glass transition temperature, resulting in improved thermal stability. On the other hand, when the amount of FDA or F-FDA was decreased, thermal stability was decreased slightly but the molecular chain was formed to be relatively long and the molecular weight was increased, thus improving optical properties such as optical transmittance and yellow index and decreasing CTE.

However, in Comparative Example 1, when FDA or F-FDA was not added or was added in too low an amount to the extent of not reaching 3 mol % based on the total molar amount of diamine, high thermal stability could not be expected. In Comparative Examples 4 and 5, when the amount thereof was increased, optical properties and CTE were deteriorated, and in Comparative Examples 6 and 7, when FDA or F-FDA alone was used as the diamine, polymerization stability was deteriorated, making it difficult to form a film.

The invention claimed is:

1. A polyamide-imide film, manufactured from a polyamide-imide precursor,
wherein the polyamide-imide precursor has a molecular structure in which a first polymer and a second polymer are copolymerized, wherein the first polymer is obtained from polymerization of a dianhydride and a diamine, and the second polymer is obtained from polymerization of a diamine and an aromatic dicarbonyl compound,
wherein the diamine of the first polymer and/or the second polymer includes at least one of 9,9-bis(4-aminophenyl)fluorene (FDA) and 9,9-bis(4-amino-3-fluorophenyl)fluorene (F-FDA), and a total amount of the at least one of the FDA and the F-FDA is 3 to 50 mol % based on a total molar amount of the diamine of the first polymer and the diamine of the second polymer, and
wherein the dianhydride includes 2,2-bis(3,4-dicarboxyphenyl)hexafluoropropane dianhydride (6FDA) and biphenyl tetracarboxylic dianhydride (BPDA) at a molar ratio of 4:6 to 2:8.

2. The polyamide-imide film of claim 1, wherein the polyamide-imide film has a coefficient of thermal expansion (CTE) of 30 ppm/° C. or less at 50 to 300° C.

3. An image display device, comprising the polyamide-imide film of claim 2.

4. The polyamide-imide film of claim 1, wherein the polyamide-imide film has a glass transition temperature (Tg) of 350 to 380° C.

5. An image display device, comprising the polyamide-imide film of claim 4.

6. The polyamide-imide film of claim 1, wherein the polyamide-imide film has a transmittance of 87% or more measured at 550 nm for a film thickness of 10 to 100 μm and a yellow index of 7 or less in accordance with ASTM E313.

7. An image display device, comprising the polyamide-imide film of claim 6.

8. An image display device, comprising the polyamide-imide film of claim 1.

* * * * *